United States Patent [19]
Weisgerber

[11] 3,852,959
[45] Dec. 10, 1974

[54] SECONDARY AIR INJECTION APPARATUS

[75] Inventor: Thomas W. Weisgerber, Saginaw, Mich.

[73] Assignee: General Motors Corporation, Detroit, Mich.

[22] Filed: Sept. 26, 1973

[21] Appl. No.: 400,794

[52] U.S. Cl.................... 60/290, 60/307, 137/110, 417/76
[51] Int. Cl............................................ F02b 75/10
[58] Field of Search........ 60/289, 290, 307; 417/76, 417/84

[56] References Cited
UNITED STATES PATENTS

| | | | |
|---|---|---|---|
| 2,707,021 | 4/1955 | Harris | 137/110 |
| 3,060,678 | 10/1962 | Ridgway | 60/290 |
| 3,082,597 | 3/1963 | Hamblin | 60/307 |
| 3,203,168 | 8/1965 | Thomas | 60/290 |
| 3,689,237 | 9/1972 | Stark | 137/110 |

Primary Examiner—Douglas Hart
Attorney, Agent, or Firm—F. J. Fodale

[57] ABSTRACT

An internal combustion engine is equipped with apparatus for injecting secondary air into the exhaust manifold of an internal combustion engine. The apparatus includes an air pump which injects secondary air into the exhaust manifold and an aspirator which augments the air from the air pump with ambient air under certain operating conditions.

In a first embodiment, the entire output of the air pump is passed through a subsonic aspirator at lower engine speeds, and at higher engine speeds a substantially constant air flow to the aspirator is maintained and the excess air from the air pump is bypassed around the aspirator and injected into the exhaust manifold. In a second embodiment, a supersonic aspirator is used for augmenting the output air of the air pump at lower engine speeds. In a third embodiment, the entire air pump output air bypasses the aspirator at higher engine speeds.

6 Claims, 6 Drawing Figures

SECONDARY AIR INJECTION APPARATUS

My invention relates generally to apparatus for injecting secondary air into an exhaust conduit of an internal combustion engine or the like.

For the past few years, concern for the environment has stimulated efforts to reduce the level of pollutants in the exhaust of automobile internal combustion engines. One known way of reducing emission levels is the use of an engine driven air pump which injects secondary air into the exhaust system to more fully complete the combustion process. The requirements for secondary air vary for different operating conditions of the automobile producing the problem of matching the air available from the air pump with the secondary air required by the engine for attaining acceptable emission levels.

It is desirable to avoid the all-too-easy solution of providing an air pump which has the required capacity at the most adverse conditions as this results in a larger air pump, increased weight and inefficient operation which increases fuel consumption.

The prior art in the U.S. Pat. to Robert J. J. Hamblin No. 3,082,597 issued Mar. 26, 1963 discloses an apparatus for injecting secondary air into engine exhaust gases in which a smaller engine powered air pump discharges air into an aspirator which augments the pump discharge air with ambient air so that a greater quantity of secondary air is delivered to the engine exhaust system. This apparatus, however, presents a problem in that the aspirator operates efficiently over only a very narrow range of input values. Consequently, this arrangement like the first solution also results in overcapacity and the wasting of power under many operating conditions. At this point it should be noted that the adverse conditions are normally low speeds, such as idle or off-idle conditions. If the first solution is used, i.e., an air pump having sufficient capacity at low speeds, it will have an overcapacity at higher speeds which wastes power and injures fuel economy. The same is true of the Hamblin apparatus. Also, if the Hamblin apparatus has its aspirator designed for efficient operation at low speeds, the aspirator will not permit sufficient air to pass through it at higher speeds.

It is broadly the object of my invention to provide a highly efficient apparatus for injecting secondary air into the exhaust conduit of an internal combustion engine.

Another object of my invention is to provide such an apparatus which produces a quantity of air which more nearly matches the secondary air requirements of the engine under both low speed and high speed operating conditions than the apparatus heretofore known.

Yet another object of my invention is to provide a highly efficient apparatus for injecting secondary air into the exhaust conduit of an internal combustion engine which apparatus has a staged mode of operation to more nearly match the air available from the apparatus to the secondary requirements of the engine.

Still another object of my invention is to provide secondary air injection apparatus including an engine driven air pump and an aspirator in which the pump has a higher capacity than the aspirator so that the apparatus can more nearly match the secondary air requirements of the engine.

Yet still another object of my invention is to provide such a secondary air injection apparatus in which an aspirator efficiently augments the air from an engine driven air pump at lower engine speeds and efficiently provides secondary air at higher engine speeds by having at least a portion of the air from the air pump bypass the aspirator.

The exact nature of this invention as well as other objects and advantages thereof will be readily apparent from consideration of the following specification relating to the annexed drawings in which.

Figure 1:
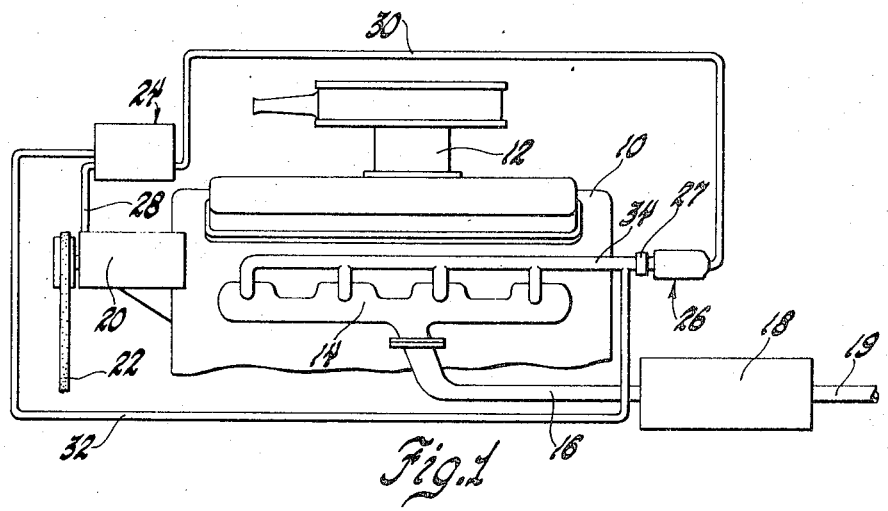
FIG. 1 is a schematic view of an internal combustion engine equipped with apparatus for injecting secondary air into the exhaust manifold in accordance with my invention.

Referring now to the drawings and particularly to FIG. 1, there is represented an automotive type internal combustion engine 10 provided with a carburetor block-air filter 12 and an exhaust manifold 14 which discharges the exhaust gases from the engine 10 into exhaust pipe 16. The exhaust pipe in turn may be connected to a muffler or catalytic converter 18 which in turn is connected to a tail pipe 19.

The engine 10 is equipped with apparatus for injecting secondary air into the exhaust manifold 14 for the purpose of further completing the combustion of the exhaust gases thereby lowering the level of pollutants of the exhaust gases which are ultimately emitted from the engine exhaust system. This apparatus generally comprises an air pump 20 driven by the engine with a pulley belt 22 or the like, a valve 24 (represented as a block), an aspirator 26 (represented by a block), a check valve 27 (represented by a block) and conduit means operatively connecting the air pump 20, valve 14 and aspirator 26 to the exhaust manifold 14.

More particularly, the conduit means comprises a conduit 28 connecting the discharge port of the air pump 20 to the valve block 24 from whence emerges a branch 30 and a parallel branch 32 which merge into a supply manifold 34 to connected to the exhaust manifold 14 at several points. The aspirator 26 is connected into the branch 30 and is bypassed by the branch 32.

Figure 2:
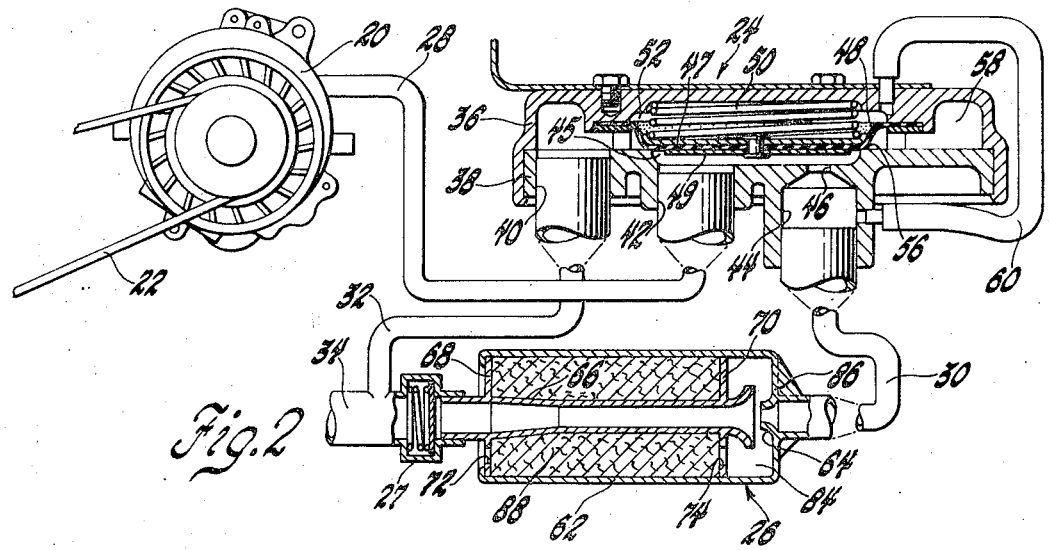
FIG. 2 is an enlarged, more detailed view of the apparatus shown in FIG. 1.

Referring now to FIG. 2, the conduit means just described are again illustrated schematically but in a different form to better illustrate details of the valve 24 and the aspirator 26, it being understood that in practice, the conduit means may take many forms to establish the same flow pattern.

The valve 24 comprises a cup-shaped housing 36 and a bottom plate 38 suitably secured together to form an internal chamber. The bottom plate 38 is provided with three ports 40, 42 and 44. The ports 42 and 44 open into a central recess 45 in the bottom plate 38 and the port 44 is provided with an orifice type restrictor 46 at its opening into the central recess 45. A movable valve element comprises a round flexible diaphragm 48 having its periphery clampingly secured to the housing 36. The central portion of the diaphragm 48 is held rigid by metal stampings 47 and 49 secured on the diaphragm by a rivet. A coil spring 50 disposed in a chamber 52 above the diaphragm 48 reacts against the metal stamping 47 and spring biases the central portion of diaphragm 48 into engagement with an annular seat 56 surrounding the central recess 45 of the bottom plate 38 thus normally closing off fluid communication between the depressed central recess 45 and the chamber 58 on the lower side of the diaphragm 48. The port 40 opens into the chamber 58 at a location outwardly of the seat 56 opposite the central recess 45 and consequently the port 40 is also normally closed from fluid communication with the central recess 45. A tube 60 fluidly connects the chamber 52 above the diaphragm 48 to the port 44 at the downstream side of the orifice 46.

The aspirator 26 comprises a cylindrical housing 62 having a convergent nozzle 64 intergrally formed in an end wall 86. The nozzle 64 is aligned with and spaced slightly from a bell-mouthed inlet of a diffuser 66 which is supported by an opposite end wall 68 of the housing 62 and an intermediate support wall 70. The end wall 68 is provided with inlets 72 and the intermediate support wall is provided with passages 74 which admit ambient air into the chamber 84 between the intermediate wall 70 and the end wall 86. The annular chamber surrounding the diffuser 66 between the opposite end wall 68 and the intermediate wall 70 contains a filter 88 which serves to filter dirt and the like from the ambient air which is admitted to the chamber 84.

The particular aspirator 26 thus illustrated is technically referred to as an ejector and operates in a well-known manner. Briefly the convergent nozzle 64 ejects a high velocity stream of air into the diffuser 66 creating a vacuum which causes ambient air to be sucked into the inlets 72 through filter 88, passages 74 and chamber 84 and into the bell-mouthed inlet of the diffuser 66. Thus the mass of air exiting the diffuser is greater than the mass of air entering the nozzle 64 since it is augmented with the additional ambient air sucked into the inlet of the diffuser 66.

The valve 24 and the aspirator 26 are operatively associated to the conduit means as follows: The conduit 28 leading from the outlet port of the air pump 20 is connected to the port 42 of the valve 24 which opens into the central recess 45. The branch 30 is connected from the port 44 to the nozzle 64 at the inlet of the aspirator 26. The exit of the diffuser 66 of the aspirator 26 is connected to the check valve 27. The check valve is connected to the manifold 34. The branch 32 connects the port 40 to the manifold 34 downstream of the connection with the check valve outlet.

The operation of the apparatus shown in FIGS. 1 and 2 will now be described. At low engine speeds, such as idle and off-idle conditions, the movable valve element is in the position shown in FIG. 2 and the entire output of the air pump 20 is delivered to nozzle 64 of the aspirator 26 via conduit 28, port 42, recess 45, port 44 and branch 30. From the nozzle 64 the air pump output air flows at high velocity into the bell-mouthed inlet of the diffuser 66 creating a vacuum and causing ambient air to be sucked into the bell-mouthed inlet. The air pump air and the ambient air are mixed and expanded in the diffuser 66 from whence the combined air is delivered to the exhaust manifold as secondary air. Since the port 40 is closed off from the central recess 45, the secondary air delivered from the exit of the diffuser 66 to the exhaust manifold 14 through the check valve 27 and via the manifold 34 comprises the total output of the air pump augmented by ambient air.

As the engine speed increases, there of course is an increase in the mass of air flow from the air pump outlet and consequently a proportionate increase in secondary air delivered to the exhaust conduit. Any aspirator by nature works efficiently only over a narrow range of air inputs and furthermore reaches a limit on the amount of air that can be passed through it. In order to design the aspirator to operate efficiently at lower engine speeds and yet not limit the amount of secondary air that can be delivered to the exhaust manifold 14, my apparatus includes the branch 32 which permits a portion of the pump output air to bypass the aspirator 26. More particularly, at some preselected high engine speed, the pressure differential across the movable valve element overcomes the force of the spring 50 unseating the movable valve element from the seat 56 and allowing a portion of the air entering the central recess 45 from the air pump 20 to flow into the chamber 58, out the port 40 and into the branch 32 bypassing the aspirator 26. The pressure differential across the movable element is generated by the orifice 46 and thus is sized to open the valve at some predetermined air flow which is directly related to engine speed. Consequently as the engine speed and the air pump output is increased beyond this predetermined point, the movable valve element is moved further away from the seat 56 and essentially all of the increased air pump air flows through the bypass branch 32.

The function of the check valve 27 is to prevent reverse flow of air through the aspirator from bypass branch 32 caused by high back pressures being generated in the exhaust system and thus in manifold 34. The bypassed air must then enter manifold 34 and thus the exhaust manifold pump can be efficiently augmented with ambient air at lower engine speeds and yet which does not limit the amount of secondary air which can be injected at higher engine speeds.

Figure 3:
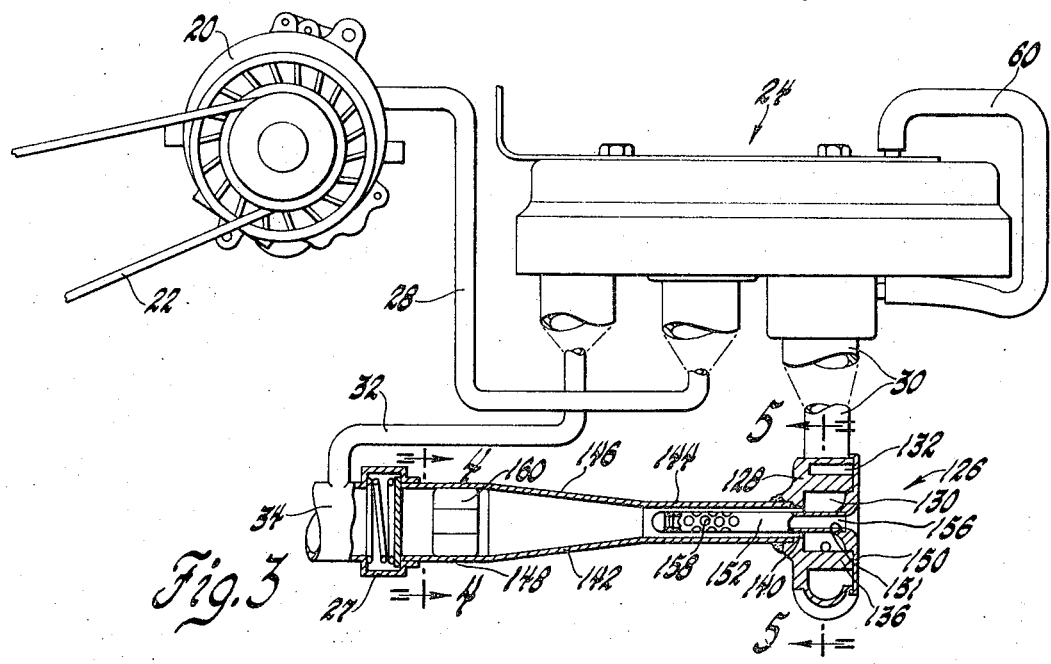
FIG. 3 is a view similar to FIG. 2 showing another embodiment of an apparatus in accordance with my invention which uses a different type of aspirator.

Referring now to FIG. 3, there is shown another embodiment of an apparatus in accordance with my invention. In this second embodiment a different type of aspirator 126 is used. However, all of the other components of the apparatus are identical to the corresponding components in FIGS. 1 and 2 and are identified with the same numerals.

Figure 4:
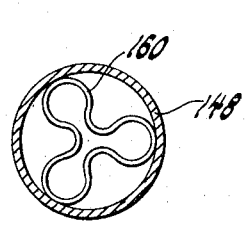
FIG. 4 is a section taken along the line 4—4 of FIG. 3.
Figure 5:
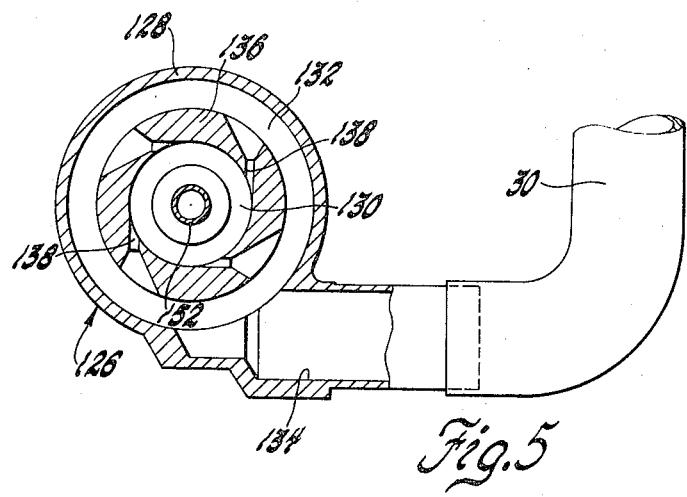
FIG. 5 is a section taken along the line 5—5 of FIG. 3.

The aspirator 26 shown in the prior embodiment is a subsonic flow device and the negative pressure which can be generated at the diffuser inlet for sucking ambient air into the air stream is limited to that which can be achieved when the air flow at the nozzle exit reaches a sonic velocity. In some instances, however, it may be desirable to augment the air pump output to a greater extend than would be permissible with such a subsonic device. This can be accomplished by use of a supersonic aspirator 126 such as is illustrated in FIG. 3. extent The supersonic aspirator 126 comprises a housing 128 divided into an inner chamber 130 and an outer concentric toroidal chamber 132. The outer toroidal chamber 132 is connected to the branch 30 by a tangentially disposed boss 134. See FIG. 5. The circumferential wall 136 separating the toroidal chamber 132 from the inner chamber is provided with four nozzles 138. These nozzles increase air speed to sonic velocity and direct the air tangentially into the inner chamber 130 causing a whirling motion. The housing 128 has an opening 140 communicating with a duct 142 having a cylindrical vortex section 144 of reduced diameter compared to the chamber 130, a conical diffuser section 146 and a cylindrical delivery section 148. The opposite side wall 150 of the housing 128 has a smaller opening 151 in which is mounted the end of a tube 152 which extends through the chamber 130 and into the vortex section 144 of the duct 142. The end portion of the tube 152 in the vortex section 144 has a plurality of holes 158 which admit ambient air taken in through the opening 156 to the vortex section 144. The whirling air in the inner chamber 130 flows axially into the vortex section 144 of the duct 142 and increases in speed to supersonic velocities due to the smaller diameter of the vortex section 144 which forces the air to whirl at a decreased radius of rotation. These supersonic speeds produce a lower negative pressure than possible with the subsonic device shown in the previous embodiment and consequently a greater quantity of ambient air is sucked into the vortex section 144 via the tube 152. The combined air pump air and ambient air is then expanded in the diffuser 146 to a subsonic velocity. From the diffuser 146 the combined air flows into the delivery tube 148 which may include a flow straightener 160 such as a simple tubular open clover leaf. See FIG. 4. From the delivery tube 148 the air flows into a check valve 27 and then into the supply manifold 34 from whence it is delivered to the engine exhaust manifold 14. As with the prior embodiment, the valve 24 which receives the output of the pump 20 through the conduit 28 delivers all of the air to the exhaust manifold 14 via the branch 30 and aspirator 126 which augments the air pump output air with ambient air up to a predetermined engine speed and air flow in the branch 30. When this predetermined engine speed and flow rate is attained, the valve thereafter diverts substantially all of the excess air from the air pump 20 through the bypass branch 32 which delivers the excess air directly into the exhaust manifold 14 bypassing the aspirator 126.

Figure 6:
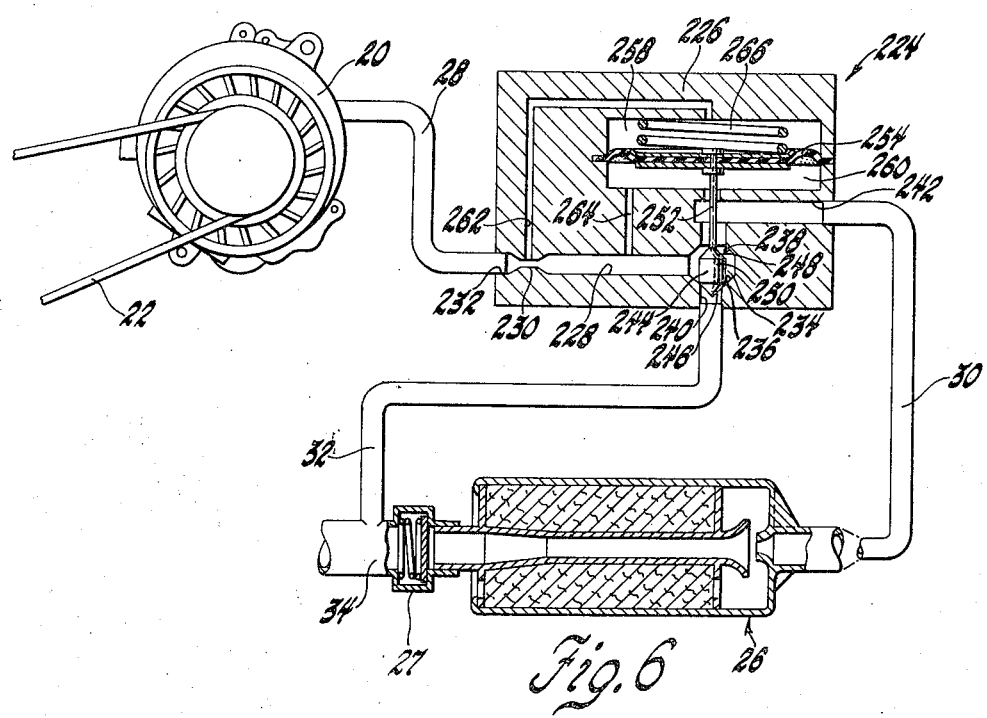
FIG. 6 is a view similar to FIGS. 2 and 3 showing yet another embodiment of an apparatus in accordance with my invention which uses a different valving arrangement than that shown in FIGS. 2 and 3.

Referring now to FIG. 6 there is shown yet another embodiment of apparatus in accordance with my invention. This third embodiment differs from the previous two embodiments by the valving arrangement 224 which is employed. Otherwise the apparatus is identical to that shown in FIGS. 1 and 2 and the remaining components have been identified with the same numerals. Although the aspirator 26 is shown in this third embodiment, it should be understood that the apparatus 126 shown in FIGS. 3, 4 and 5 could be used in its place.

Whereas the prior two embodiments employ a valving arrangement for bypassing all the excess air from the air pump around the aspirator while maintaining a substantially constant air flow to the aspirator once a predetermined engine speed and air flow to the aspirator is achieved, this third embodiment employs a valving arrangement for bypassing all the air from the air pump at some predetermined engine speed at which the air pump 20 is adequate to supply sufficient secondary air to the exhaust manifold 14 (shown in FIG. 1) via the bypass branch 32 and supply manifold 34.

More particular, a valving arrangement may be constructed in the following manner for achieving this mode of operation. A valve 224 comprises a housing 226 which includes an inlet passage 228 having a venturi section 230 downstream from inlet port 232 to which is connected the conduit 28. The inlet passage 228 opens into a valve chamber 234 having a lower valve seat 236 and an upper valve seat 238 surrounding inlets for a bypass passage 240 and an aspirator passage 242 respectively to which are connected to the branches 32 and 30 respectively.

Disposed within the valve chamber 234 is the head 250 of a double acting movable valve element 244 which head has a lower portion 246 adapted to seat on the lower valve seat 236 and an upper portion 248 adapted to seat on the valve seat 238. The head 250 is connected by a stem 252 to a flexible diaphragm 254 secured in the valve 224 and forming an upper chamber 258 and a lower chamber 260. A passage 262 fluidly connects the throat of the venturi section 230 of the inlet passage 228 to the upper chamber 258 and a second passage 264 fluidly connects the lower chamber 260 to the inlet passage 228 at a point downstream of the throat of the venturi section 230. A spring 266 disposed in the upper chamber 258 normally biases the valve head 250 into the position shown in FIG. 6 wherein the lower portion 246 engages the lower valve seat 236 closing off fluid communication between the inlet passage 228 and the bypass passage 240.

The operation of the apparatus with the above described valve 224 is as follows. Under low engine speeds, such as during idle and off-idle conditions, all of the air from the air pump is delivered to the aspirator 26 via conduit 28, inlet passage 228, aspirator passage 242 and branch 30. As before, the aspirator 26 sucks in ambient air and the combined air comprising the air pump air augmented with ambient air is delivered to the distribution manifold 34. At some predetermined engine speed, the pressure drop produced by the venturi section 230 in the inlet passage 228 (which pressure drop acts on the diaphragm 254 via the passages 262 and 264) is sufficient to overcome the spring 226 and move the valve head 250 upwardly until the upper portion 248 of the head 250 seats against the upper valve seat 238. This movement closes off flow to the branch 30 and opens the bypass passage 240 and consequently all of the air from the air pump bypasses the aspirator 226. This third embodiment has the advantage that the back pressure on the pump 20 produced by the aspirator can be removed if at some point in operation the air pump 20 is sufficient to provide all the secondary air required for exhaust emission control.

I wish to be understood that I do not desire to be limited to the exact details of construction shown and described, for obvious modifications will occur to a person skilled in the art.

I claim:

1. Apparatus for injecting secondary air into the exhaust conduit of an internal combustion engine or the like comprising a constant displacement air pump having a discharge port, said air pump when driven by an internal combustion engine discharging air under pressure from said discharge port at a flow rate which increases with engine speed, conduit means fluidly connected to said discharge port at one end and adapted to be connected to an exhaust conduit of said internal combustion engine at another end, said conduit means comprising parallel branches, one of said branches including an aspirator having a motive fluid inlet for receiving air discharged from said air pump, an inlet suction port means located downstream of said motive fluid inlet and exposed to ambient air, a combined fluid outlet downstream of said inlet suction port means and a check valve downstream of said combined fluid outlet, whereby secondary air injected into said exhaust conduit via said one branch is augmented by ambient air sucked into the aspirator by the portion of air from said air pump flowing through said aspirator, valve means normally closing the other of said branches, and means for opening said valve means responsive to air flow through said conduit means above a predetermined value whereby at lower engine speeds, the secondary air injected into said exhaust conduit is greater than the volume of air discharged from said air pump, and whereby at higher engine speeds, at least a portion of the air discharged from said air pump bypasses said aspirator and is injected directly into said exhaust conduit.

2. The apparatus as defined in claim 1 wherein said valve means is a proportioning valve and wherein said means for opening said valve means is responsive to air flow in said one branch whereby the air flow through said one branch is maintained at said predetermined value when air is flowing through said other branch to bypass said aspirator.

3. The apparatus as defined in claim 1 wherein said valve means is a dual acting valve means which closes said one branch upstream of said aspirator subsequent to the opening of said other branch and wherein said means for opening said valve means is responsive to air flow in said conduit at a point upstream of said valve means whereby all of said air discharged from said air pump bypasses said aspirator and is injected directly into said exhaust conduit.

4. Apparatus for injecting secondary air into the exhaust conduit of an internal combustion engine or the like comprising a constant displacement air pump having a discharge port, said air pump when driven by an internal combustion engine discharging air under pressure from said discharge port at a flow rate which increases with engine speed, valve means having an inlet port, an outlet port and a bypass port, a conduit fluidly connecting said discharge port of said pump to said inlet port, a first branch conduit connected to said outlet port at one end and adapted to be connected to an exhaust conduit of said internal combustion engine at another end, said first branch including an aspirator having a motive fluid inlet for receiving air discharged from said air pump, an inlet suction port means located downstream of said motive fluid inlet and in fluid communication with ambient air, a combined fluid outlet downstream of said inlet suction port means and a check valve downstream of said combined fluid outlet, whereby secondary air injected into said exhaust conduit via said one branch is augmented by ambient air sucked into the aspirator by the portion of air from said air pump flowing through said aspirator, a second branch conduit connected to said bypass port at one end and adapted to be connected to said exhaust conduit at another end, said valve means normally closing off fluid communication between inlet port and said bypass port and establishing fluid communication between said inlet port and said outlet port, and said valve means further including engine speed responsive means for establishing fluid communication between said inlet port and said bypass port responsive to a predetermined engine speed whereby at lower engine speeds, the secondary air injected into said exhaust conduit is greater than the volume of air discharged from said air pump, and whereby at high engine speeds at least a portion of the air discharged from said air pump bypasses said aspirator and is injected directly into said exhaust conduit.

5. The apparatus as defined in claim 1 wherein said speed responsive means maintains air flow through said first branch conduit substantially constant above said predetermined engine speed.

6. The apparatus as defined in claim 4 wherein said speed responsive means closes off fluid communication between said inlet port and said outlet port at said predetermined engine speed.

* * * * *

PO-1050
(5/69)

UNITED STATES PATENT OFFICE
CERTIFICATE OF CORRECTION

Patent No. 3,852,959  Dated December 10, 1974

Inventor(s) Thomas W. Weisgerber

It is certified that error appears in the above-identified patent and that said Letters Patent are hereby corrected as shown below:

In the Specification:

Column 2, line 51, after "manifold 34" delete "to".

Column 3, line 14, "opposite" should be -- surrounding --.

Column 4, lines 60-61, delete "extent".

Column 6, line 40, "spring 226" should be -- spring 266 --.

Signed and sealed this 11th day of March 1975.

(SEAL)
Attest:

RUTH C. MASON
Attesting Officer

C. MARSHALL DANN
Commissioner of Patents
and Trademarks